United States Patent [19]

Mathews

[11] Patent Number: 4,998,402
[45] Date of Patent: Mar. 12, 1991

[54] TREE SHAKER FORCE REGENERATOR

[76] Inventor: Clifford D. Mathews, 8447 Marshall St., Sutter, Calif. 95982

[21] Appl. No.: 437,128

[22] Filed: Nov. 16, 1989

[51] Int. Cl.$^5$ ............................................. A01D 46/26
[52] U.S. Cl. ..................... 56/340.1; 74/574;
 188/378; 188/379; 366/128
[58] Field of Search .............. 56/340.1, 328.1;
 74/573 R, 574; 188/378–380; 267/136; 366/128

[56]   References Cited
U.S. PATENT DOCUMENTS

| | | | |
|---|---|---|---|
| 3,121,304 | 2/1964 | Herbst | 56/340.1 |
| 3,460,329 | 8/1969 | Overstreet | 56/340.1 |
| 3,477,216 | 11/1969 | Martin | 56/340.1 |
| 3,566,593 | 3/1971 | Whitfield | 56/340.1 |
| 3,771,768 | 11/1973 | Gebendinger | 56/340.1 |

Primary Examiner—Bruce M. Kisliuk
Attorney, Agent, or Firm—Mark C. Jacobs

[57]   ABSTRACT

A rotational force counterbalancing device comprising a weight linearly moveable between two impact points and mounted on a fruit tree shaker to dampen the attempt of an operating shaker to rotate in the direction of the aligned weights of the shaker. As the shaker attempts to move in one direction, the weight of the counterbalancing device moves in the opposite direction.

4 Claims, 3 Drawing Sheets 4,998,402

TREE SHAKER FORCE REGENERATOR

FIELD OF INVENTION

This invention relates to mechanical shaking of trees for fruit and nut removal.

PRIOR ART

In the mid 1960's mechanical tree shaking, for crop removal, was perfected to a point that it became economically feasible. One such mechanical shaking device is shown in FIG. 1, this consisted of counter-rotating wheels 3 with eccentric weights 5. The wheels were of different diameter driven by a hydraulic motor via a "V" belt. As the wheels rotated the weights would line up at various points of the compass since the wheels were of different sizes. This caused the shaking force to be generated in the direction of wheel alignment.

From the beginning this design had an inherent flaw, when FIG. 3, the weights 1 were aligned as shown, the case holding the weights 2 tended to rotate in the direction of the aligned weights, using the tree as a pivot point. When the weights were aligned in the opposite direction the movement was reversed. Consequently, while the devise was shaking the tree, there was rotation about the point of clamping the tree. This caused several problems, the tree bark was damaged, heat was generated, shaking was imparted to the machine which carried the shaking device from tree to tree. The "fix" for this problem FIG. 4, was to use two layers of belting 1 between the clamping device and the tree. It can be seen in FIG. 4, that a layer of grease is added between the two plys of belting 2. This solved one of the aforementioned problems, unwanted heat is still generated, we shake the parent machine, but we don't bark the tree.

In the twenty-five years of mechanical tree shaking this is the state-of-the-art.

I have invented a device which causes the troublesome forces to either nullify themselves or to regenerate energy which can be added to the shaking process. You can see in FIG. 5 there is an object attached to the tree shaker free to move or remain stationary in relation to the shaker subject to the constraints of its frame. When the shaker attempts to rotate in the direction of the aligned weights it is blocked by the constraining means hitting the weighted mass. Not only does the weight prevent the rotation of the shaking device, but the resultant of this sudden stop imparts force back to the tree. This lowers the power requirement to accomplish the same amount of shaking. Another benefit of this device, it greatly reduces the shake-back to the carrier. The amount of force regeneration and/or force absorption can be varied by the resilience and density of the restraining device, and by the amount of space between the weight and the constraint.

SUMMARY

This invention; a mass mounted upon a tree shaking device in such a manner so that the forces generated by the weight alignment are either blocked or regenerated as force back to the tree. This invention solves the problem of rotational forces pivoting about the tree. The attempts to solve this problem have heretofore been dealing with the affect. This invention eliminates the cause.

DETAILED DESCRIPTION

Figure 1:
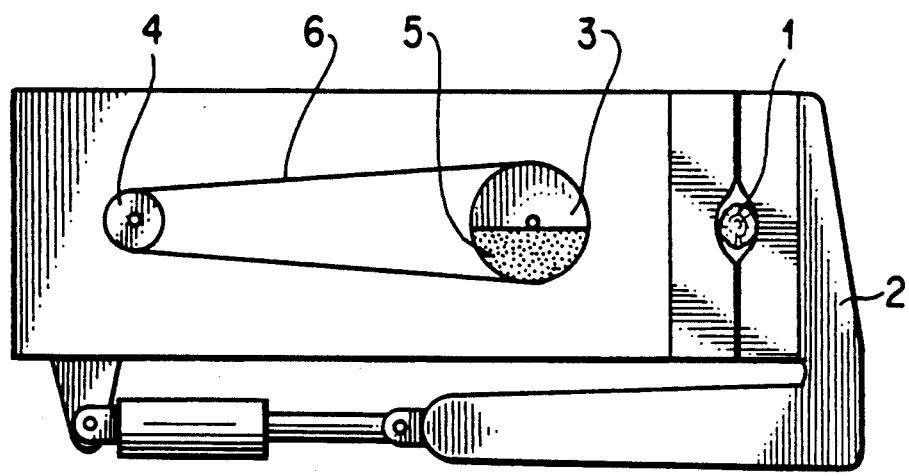
FIG. 1. This shows a tree shaking device clamped to a tree.
Figure 2:
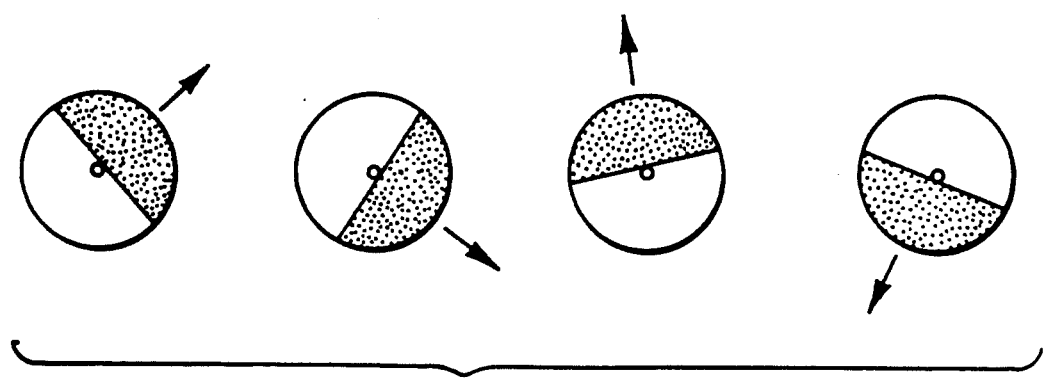
FIG. 2 This shows some of the various directions the shaking device can move depending on weight alignment.
Figure 3:
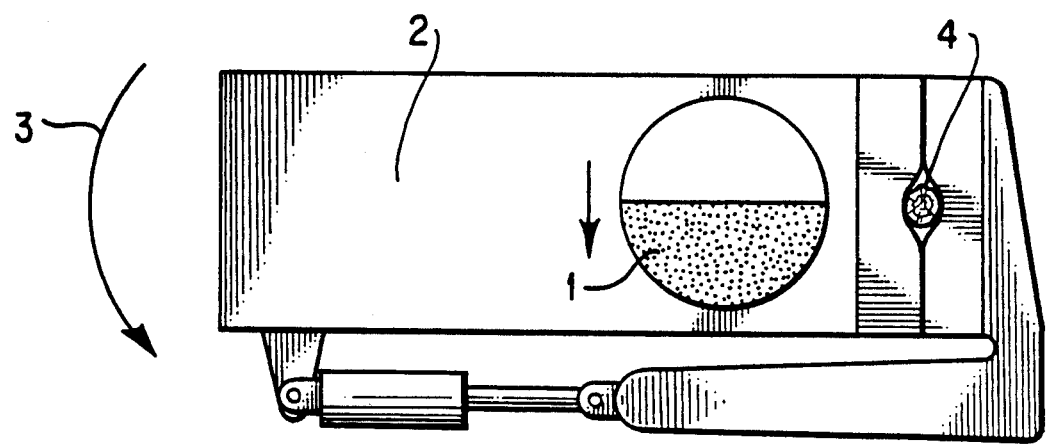
FIG. 3 This shows the tendency of the shaking device to rotate in the direction of weight alignment.
Figure 4:
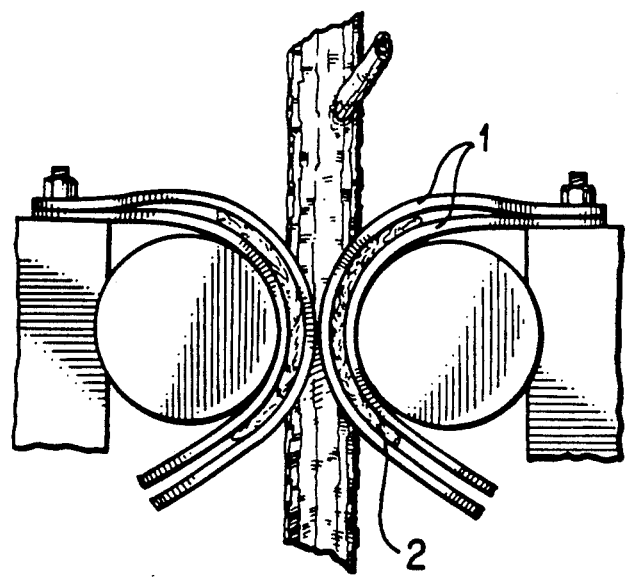
FIG. 4 This shows the application of grease between the two plys of belting to prevent damage to the cambium layer of the tree bark.
Figure 5:
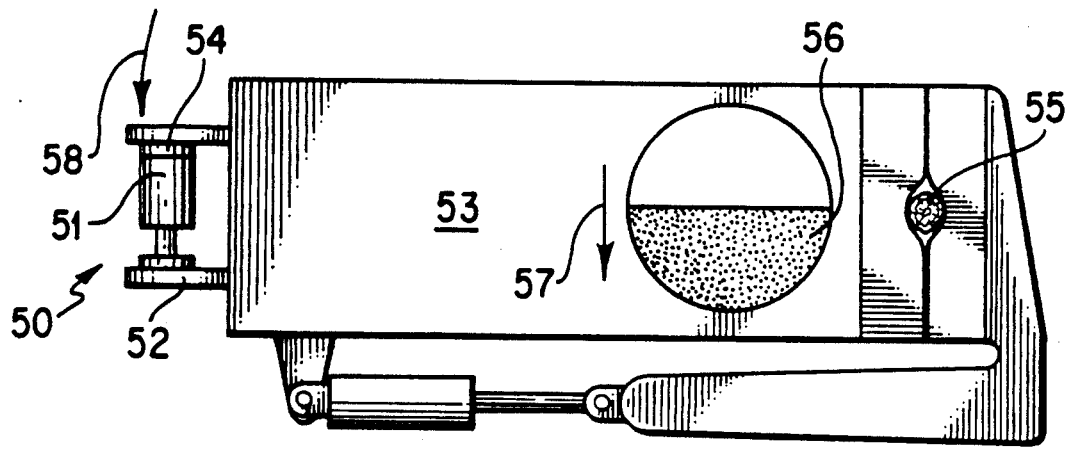
FIG. 5 This shows a weighted mass attached to a shaking device.
Figure 6:
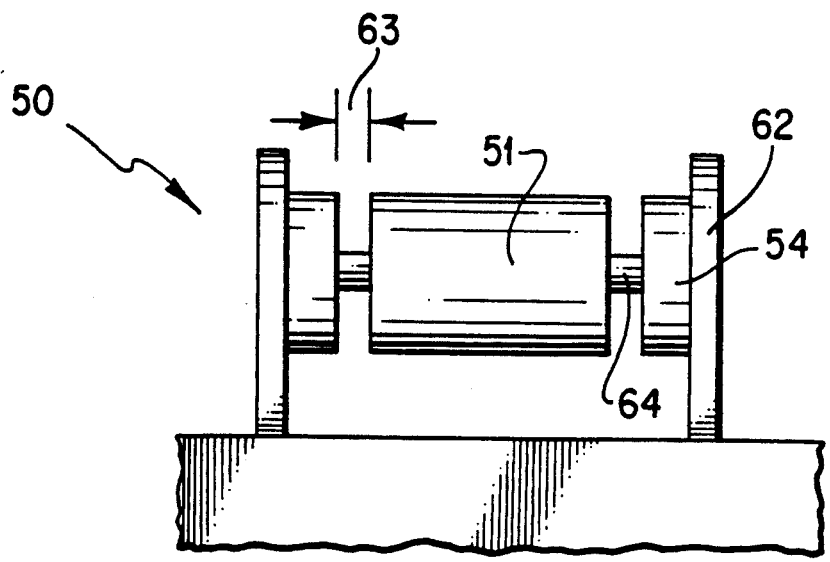
FIG. 6 This shows the details of the mounting and operation of the counteracting weight.

The device of this invention, 50 is shown in FIGS. 5 and 6. In FIG. 5 it is seen mounted on a fruit-nut tree shaker, 53 while in FIG. 6 it is shown by itself. Device 50 which is designed to counterbalance the rotational forces of the tree shaker 53, comprises a generally U-shaped frame 52 which includes a pair of spaced arms 62 (FIG. 6). A shaft 64 is disposed between the arms 62. Constraining means 54, such as of rubber are fixedly mounted either on the shaft adjacent to the inner walls of the arms 62 or on the arms 62 with the shaft passing therethrough as may be desired. Weight 51, which is preferably a cylinder, is slidably disposed upon the shaft such that it can move between each of the two constraining means 54.

In FIG. 5, designator 55 represents the tree being shaken by shaker 53. Note the position of the weights 56 in shaker 53 which create the imbalance as is known in the art, to thereby cause the shaker to move in the direction of directional arrow 57. As a result of such movement, weight 51 is seen to be disposed abutting the left constraining means as is being pointed out by emphasis arrow 58.

As shown in FIG. 6 the weight 51 must have sufficient mass to counteract the rotational forces. I accomplished this by filling a metal pipe with lead, leaving a hole in the center so that said weight could move on shaft 64. The constraining means 54 inserted between the weight 51 and the mounting arms 62 on at least one end of said shaft, determines the amount of absorption or regeneration of the rotational forces. If the insert 54 is soft, such as rubber, the forces tend to be absorbed. If harder material is used for the constraining means 54 then more force is returned to the tree. Also, the intensity of the force can be modified to some extent by the amount of space 63 between the weight and the constraining means 54.

I claim:

1. A tree shaking device having a body with a clamping means on one end of said body to secure it to a tree, an eccentric mass attached to said body with said eccentric mass being rotatable about a rotational axis which is generally parallel to a longitudinal axis of said tree, and a means to resist rotational forces of said body about said tree, the means to resist rotational forces being mounted on an opposite end of said body from said clamping means and being a mass with a longitudinal passage, the mass being mounted on a shaft which is perpendicular to the rotational axis of the eccentric mass, said shaft being mounted between two arms such that said mass can oscillate on said shaft between said arms, and a resilient means mounted about at least one end of said shaft to allow said mass to compress said resilient means at the end of a stroke of the oscillation.

2. The tree shaking device of claim 1 wherein the mass with a longitudinal passage is a cylinder.

3. A device for attachment to a tree shaker, which shaker has a body with a clamping means on one end of said body to secure it to a tree, an eccentric mass attached to said body with said eccentric mass being rotatable about a rotational axis which is generally parallel to a longitundinal axis of said tree, said device being adapted to resist rotational forces when mounted on an opposite end of said body from said clamping means, and said device comprising:

a weight with a longitudinal passage, the weight being shaft mountable, a shaft which is perpendicular to the rotational axis of the shaker's eccentric mass, and having said weight slidably mounted on said shaft, which shaft is mounted between, two arms such that said weight can oscillate on said shaft between said arms, and a resilient means mounted about at least one end of said shaft to allow said mass to compress said resilient means at the end of a stroke of the oscillation.

4. The device of claim 3 wherein the weight is an cylinder.

* * * * *